United States Patent [19]
Elliott

[11] 3,930,923
[45] Jan. 6, 1976

[54] NYLON EXTRUSION COATING
[75] Inventor: Bentley W. Elliott, Milwaukee, Wis.
[73] Assignee: Milprint, Inc., Milwaukee, Wis.
[22] Filed: Oct. 4, 1972
[21] Appl. No.: 296,499

Related U.S. Application Data
[63] Continuation-in-part of Ser. No. 68,094, Aug. 31, 1970, abandoned.

[52] U.S. Cl. .............................. 156/244; 264/176 R
[51] Int. Cl.² .......................................... B29F 3/08
[58] Field of Search ............ 156/244, 331; 264/212, 264/216, 176 R

[56] References Cited
UNITED STATES PATENTS

| | | | |
|---|---|---|---|
| 3,075,864 | 1/1963 | Anderson | 156/244 |
| 3,154,608 | 10/1964 | Aronsen | 264/212 |
| 3,371,002 | 2/1968 | Reddeman | 156/244 |
| 3,374,303 | 3/1968 | Metz | 264/216 |
| 3,387,068 | 6/1968 | Scudder | 264/176 R |
| 3,570,748 | 3/1971 | Coyle et al. | 156/244 |
| 3,697,368 | 10/1972 | Bhuta et al. | 156/244 |

FOREIGN PATENTS OR APPLICATIONS

| | | | |
|---|---|---|---|
| 573,067 | 3/1959 | Canada | 156/244 |

Primary Examiner—Caleb Weston
Attorney, Agent, or Firm—Quarles & Brady

[57] ABSTRACT

Nylon resins are extrusion coated onto various substrates for the manufacture of coated packaging films by heating the nylon resin to a melt temperature of 450°–550°F, extruding the molten resin onto a chill roll through a die which is set at an angle to the chill roll, employing sub-atmospheric pressure between the extruder die and the chill roll, rapidly cooling the extruded film on the chill roll to form a substantially amorphous nylon, and thereafter joining the nylon to a substrate.

6 Claims, 3 Drawing Figures

3,930,923

NYLON EXTRUSION COATING

CROSS-REFERENCE TO RELATED APPLICATION

This application is a continuation-in-part of my copending application Ser. No. 68,094 filed on Aug. 31, 1970, now abandoned.

BACKGROUND OF THE INVENTION

1. Field.

This invention relates to the formation of nylon coatings on substrates by the extrusion coating process, particularly for the production of nylon coated flexible packaging films.

2. Description of the Prior Art.

Nylon has a number of attractive properties which are desirable for use in packaging films, including toughness, high-strength, and clarity. One of the prior art techniques for the formation of packaging films having a nylon layer is the so-called high-temperature or "hot" extrusion coating process in which a nylon resin is heated to a high temperature and extruded while still in a molten condition directly onto a substrate. A process of this type is shown in United States Pat. No. 3,570,748. Also, a leading producer of nylon resins (DuPont) presents the following information in one of its technical bulletins:

"In general, the processing temperatures used in extrusion coating are higher than those in the other processes. Melt temperatures of 550°–575°F are normally used. The higher temperatures are required to affect adhesion to the particular substrate.

The melt contacts the substrate just prior to meeting the chill roll which solidifies or quenches the melt."

An extrusion coating process as described above has a number of distinct disadvantages. The high melt temperatures employed therein, coupled with the fact that the nylon is molten when it contacts the substrate web, causes distortion of substrates which are heat sensitive, i.e. which can become physically distorted or perhaps chemically degraded when subjected to the high temperature molten nylon. Plastic films such as polyethylene and polypropylene are in this class. Secondly, the high temperature molten nylon web when extrusion coated in such fashion will tend to remove moisture from the substrates; this is a particular problem when cellophane film is being extrusion coated because removal of moisture contained in the cellophane will cause it to become brittle. Thirdly, nylons characteristically have long draw-down distances which make it difficult to achieve accurate gauge control across the width of the web when it is extrusion coated in such process. Fourthly, the type of bonding obtained in the practice of this process, while adequate in some instances, is in general of a relatively low level. Lastly, nylon extruded at the higher temperatures typical of such processes will form a coating with a relatively high degree of crystallinity.

The above disadvantages have served to limit the production of nylon extrusion coated packaging films and thereby restrict the types of nylon extrusion coated films which are available to the flexible plastic packaging user.

SUMMARY OF THE INVENTION

My present invention provides an extrusion coating process for the application of nylon layers to substrate films, particularly for the formation of packaging films having a clear thin layer of substantially amorphous nylon coating carried on the substrate. The method employs a combination of several steps which, when practiced together, serve to obviate each of the several disadvantages of nylon films encountered in other nylon extrusion coating processes and yet maximize the desirable characteristics of nylon which are valuable in packaging film uses. Briefly, my new process involves the following steps:

1. heating nylon resin in the barrel of an extrusion coating apparatus to a melt temperature of 450°–550°F, the melt temperature being measured in the adapter section of the extrusion apparatus as the molten nylon leaves the exit of the extruder barrel;

2. extruding the molten nylon through an extrusion die which is arranged at an angle to a chill roll such that the molten nylon web will contact the chill roll tangentially to its surface, and such that the molten nylon web will exit from the extrusion die at an angle normal to the plane of the lips of the die;

3. subjecting the zone between the molten nylon web and the periphery of the chill roll to sub-atmospheric pressure;

4. rapidly cooling the molten nylon on the surface of the chill roll to form a substantially amorphous nylon; and 5. removing the nylon web from the surface of the chill roll and joining it to a substrate film.

As an optional step, the nylon web may be subjected to corona discharge treatment after it is removed from the chill roll but before it is joined to the substrate in which case the treated surface of the nylon is joined to the substrate.

In comparison with the prior art extrusion coating process described previously, my new process enables the production of nylon extrusion coatings on substrates which are thermally sensitive, i.e. subject to physical distortion or chemical changes when subjected to high temperatures; prevents drying out of substrate films such as cellophane in which the moisture content is important to its physical properties; enables the production of extrusion coatings in which there is accurate gauge or thickness control of the coating across its entire width; produces nylon coated substrates in which the nylon coating is substantially amorphous; and leads to the formation of high bond strengths between the nylon extrusion coating and the substrate material.

DESCRIPTION OF THE DRAWINGS

The following description is made with reference to the accompanying drawings, in which.

DESCRIPTION OF THE PREFERRED EMBODIMENTS

Figure 1:
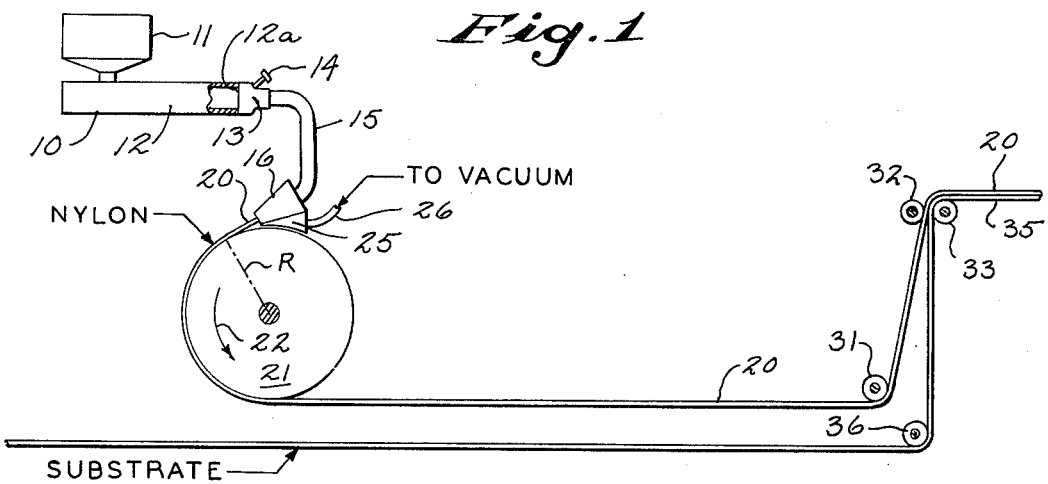
FIG. 1 illustrates an apparatus suitable for the extrusion coating process of this invention.

The process of the present invention is described first with reference to FIG. 1 which illustrates an extruder 10, including a hopper 11 through which nylon resin is fed to a barrel 12 in which it is heated and worked to a molten condition. An adapter 13 is fitted to the exit end 12a of the extruder barrel and includes a thermocouple 14 which is positioned so as to measure the temperature of the molten nylon as it leaves the end of the extruder barrel, this temperature being referred to herein as the melt temperature. A down spout 15 has one end connected to the adapter and its opposite end connected to an extrusion die 16, which has a slot that is as long as the width of the nylon film which is to be extruded. The die 16 includes a pair of spaced lips 17 and 18 (see FIG. 2) which define between them an exit 19 through which a molten nylon web 20 leaves the die and is cast onto the surface of the chill roll 21 which is rotated in direction of the arrow 22. After the web of nylon is cooled to a temperature below 200°F on the surface of the chill roll 21, it departs the roll near the bottom thereof and is led around idler roller 31 and then into the nip between joining rollers 32 and 33. A web of substrate 35 is led around idler roller 36 and also into the nip between joining rollers 32 and 33 at which the extruded nylon is firmly adhered to the substrate web 35 to form a composite film including a base layer of the substrate 35 and a coating of nylon 20. The substrate web may be a plastic film such as polyethylene, polypropylene, vinyl or polyester (such as that sold under the trade name "Mylar"); a non-plastic film such as aluminum foil; a cellulosic film such as paper, paperboard or cellophane; and other film materials useful in the packaging or converting arts. Where necessary, an appropriate primer may be applied to the surface of the substrate 35 which is to be joined to the nylon; urethane, polyester-urethane or other suitable compositions may be employed as primers.

The several steps which are essential to the practice of the nylon extrusion coating process of this invention are described in the next five paragraphs.

Firstly, the nylon resin which is fed to the extruder is to be heated to a melt temperature of 450°–550°F. The melt temperature is measured by the thermocouple 14 shown in the above apparatus of FIG. 1, and represents the temperature of the molten nylon as it leaves the exit end of the extruder barrel and is fed through the down spout into the extrusion die.

Figure 2:
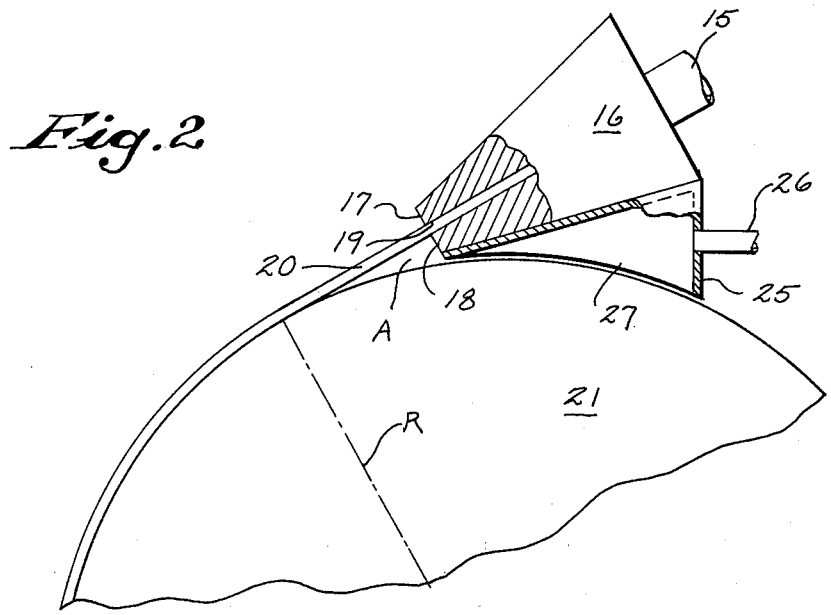
FIG. 2 is an enlarged view of a portion of the apparatus of FIG. 1, with portions broken away.

Secondly, the die 16 through which the molten nylon is cast upon the surface of the chill roll 21 is to be arranged at an angle of less than 90° to the surface of the chill roll so that the web 20 of molten nylon, see now FIG. 2, will tangentially contact the surface of the chill roll and so that the web 20 of molten nylon will be at an angle perpendicular to, or normal to, the lips 17 and 18 of the die 16 as the nylon leaves the exit 19 of the die. By "tangentially contact", it is meant that the web of nylon is perpendicular to a radius R of the chill roll 21 drawn to the point of contact of the molten web with the surface of the chill roll, see FIGS. 1 and 2. It has been found that this arrangement of the extrusion die relative to the surface of the chill roll enables the extrusion of the molten nylon with a draw-down distance of as little as 1/2 inch, and allows positioning the lips of the die about ⅛ to 3/16 inch above the chill roll. With a straight die, i.e. one that was arranged vertically relative to the surface of the chill roll, about 1½ inches is the closest draw-down which can be achieved. The new arrangement of the die relative to the chill roll prevents the formation of lip marks in the extruded film such as are obtained with the vertical die arrangement, and reduces "surging" or irregular flow of the nylon which can cause the edges of the web to weave in and out or even form a pattern down the web.

Thirdly, referring again to FIG. 2, the zone A between the extruded web of molten nylon 20 and the underlying surface of the chill roll 21 is subjected to sub-atmospheric pressure. This is accomplished by means of a vacuum hood 25 which is positioned to contact the rear face of the extrusion die 16 and is connected through a pipe 26 to a suitable vacuum pump. The hood 25 has an open bottom 27 which is positioned closely adjacent to the underlying periphery of the chill roll. It has been found that 1 to 2 inches of vacuum, i.e. sub-atmospheric pressure 1 to 2 inches (of mercury) below the ambient atmospheric pressure, is usually satisfactory. The exact amount of vacuum is adjusted so that the molten nylon web is pulled out of the extrusion guide evenly, and sufficient to cause the molten web to be drawn into contact with the surface of the chill roll. This feature prevents air from being entrapped between the nylon and the chill roll to thereby prevent non-uniform cooling of the nylon as it travels about the chill roll, and presses the nylon web into intimate contact with the chill roll to give faster cooling and enhanced web stability. It also eliminates the use of a back-up roll to press the molten nylon against the chill roll, which causes problems because nylon will stick to such back-up rolls.

Fourthly, the extruded nylon web 20 is cooled rapidly on the surface of the chill roll to a substantially amorphous condition. For this purpose, the chill roll may have suitable internal cooling apparatus which will provide a chill roll surface temperature of about 90°F to 120°F, which temperature will prevent "plate out" of nylon monomer on the chill roll and allow the formation of substantially amorphous nylon. Quick chill of the extruded nylon in this fashion provides optimum properties in the extruded nylon inasmuch as the rate of cooling and the temperature of the chill roll have a significant effect on the crystallinity of the extruded film. The nylon extruded by the present process is to be "substantially amorphous", which term is defined herein and in the claims as having a volume crystallinity of 35% or less as determined by the density method. The density method is described in Kline, *Analytical Chemistry of Polymers*, Interscience Publishers, 1959, at pp. 286–287. Briefly, the density method is based on the fact that 100% amorphous nylon has a higher specific volume than 100% crystalline nylon (specific volume being reciprocal density) and that the volume crystallinity can be linearly related to measurement of specific volume. After measuring the specific volume of a sample, the volume fraction of crystallinity, expressed in percent, is determined from the formula $X=(V_a-V)/(V_a-V_c)\times100$ in which $X$ is crystallinity in percent, $V_a$ is the specific volume of 100% amorphous material (0.917 cc/g for nylon 6), $V_c$ is the specific volume of 100% crystalline material (0.813 cc/g for nylon 6), and V is the specific volume of the sample being measured. A nylon coating with a volume crystallinity of 35% or less has several advantages in the packaging film art over more crystalline nylon in that it has better clarity, higher gloss, can be drawn at a lower temperature when making formed packages, and it "pulls down" very well when making formed packages. To produce a substantially amorphous nylon as defined, the extruded nylon should be cooled rapidly on the chill roll to a temperature under 200°F, and most usefully to a temperature of about 100°F to 120°F, before it is withdrawn therefrom. The speed of rotation and diameter of the chill roll, amount of contact the nylon web has with the chill roll, and chill roll surface smoothness should all be considered when setting the operating parameters for a particular apparatus. As an example, a smooth-surfaced chill roll, internally cooled to have a surface temperature of 90°F, and rotated at a surface speed of 200 feet per minute cooled the extruded nylon to a temperature of about 100°F and formed a substantially amorphous coating.

Fifthly, after the nylon web 20 has been cooled to a substantially amorphous condition on the chill roll, it is removed from the chill roll and joined to a web of substrate by means of joiner rollers 32 and 33, as shown in the drawings, with a surface of the nylon in contact with a surface of the substrate. If needed, any suitable primer coating may be applied to the surface of the substrate which is to be joined to the surface of the nylon.

The present process leads to the production of high quality, extrusion coated films which are suitable for flexible packaging films. The nylon layer when extrusion coated by the process can be highly transparent and yet will be firmly bonded to the substrate layer. The substrate may be printed or unprinted, and any printed information carried on it will be visible through the transparent nylon extrusion coating. The composite films are suitable as wrapping material, or for conversion into the pouches or bags, for the packaging of food and non-food items.

EXAMPLES 1 and 2

The following examples set forth specific film constructions which were produced in accordance with the process of the present invention as described above.

|  | Substrate | Primer | Nylon Coating | Melt Temp. |
|---|---|---|---|---|
| Example 1 | Low density polyethylene | Urethane | Nylon 6 – 1¼ mils thick | 500°F |
| Example 2 | Saran coated polyethylene[a] | Urethane | Nylon 6 – 1¼ mils thick | 525°F |

[a]Nylon is coated onto the saran surface.

Figure 3:
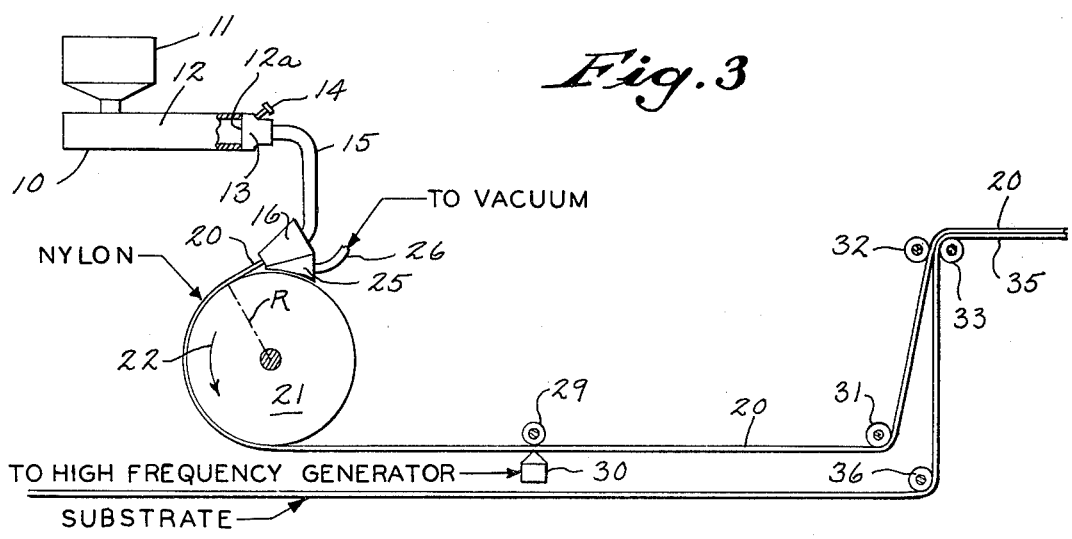
FIG. 3 is a view similar to FIG. 1 but showing the addition of an optional step in the process.

In a second embodiment of the process of this invention, see FIG. 3, the nylon web may have its surface to be joined to the substrate subjected to corona discharge treatment. This treatment is accomplished after the nylon leaves the chill roll, but before it is joined to the substrate. As shown in FIG. 3, in which the same reference numerals as in FIG. 1 denote the same apparatus, after the nylon web 20 departs the chill roll, it is led under a roller 29 and past an electrode 30 which is connected to a high frequency generator, not shown. The electrode 30 is of the type adapted to provide a corona discharge treatment on a surface of the nylon web 20. U.S. Pat. No. 2,939,956 to George J. Parks and U.S. Pat. No. 3,018,189 to George W. Traver describe suitable apparatus for providing corona discharge treatment of the surface, and other techniques are known in the converting field. A typical useful generator is manufactured by Lepel High Frequency Laboratories, Inc. as model HFSG-2, which develops output power at a frequency of 450 kilocycles on an input current of 1½ kilowatts, 60 cycles at 150 or 230 volts. Other suitable high frequency generators are well-known in the art. After being treated, the web 20 of nylon is led around idler roller 31 and into the nip between joining rollers 32 and 33, at which point it is joined to the substrate web 35 with the treated surface of the nylon adhered to the substrate. When the substrate is primed, a treated nylon surface will be joined to a primed substrate surface. The following examples 3–8 set forth specific film constructions made according to this second embodiment of the process of this invention in which the nylon is corona treated before being joined to the substrate.

EXAMPLES 3–8

|  | Substrate | Primer | Nylon Coating | Melt Temp. |
|---|---|---|---|---|
| Example 3 | Aluminum Foil | Urethane | Nylon 6 – 4 mils thick (Corona Treated) | 525°F |
| Example 4 | Medium density polyethylene | Urethane | Nylon 6 – 1¼ mils thick (Corona Treated) | 500°F |
| Example 5 | Low density polyethylene | Urethane | Nylon 6 – 2 mils thick (Corona Treated) | 500°F |
| Example 6 | Saran coated polyethylene[a] | Urethane | Nylon 6 – 1 mil thick (Corona Treated) | 525°F |
| Example 7 | Saran coated "Surlyn" ionomer film[a] | Urethane | Nylon 6 – 1¼ mils thick (Corona Treated) (Corona Treated) | 525°F |
| Example 8 | Saran coated polyethylene[a] | Urethane | Nylon copolymer- 1 mil thick (Corona Treated) | 525°F |

[a]Nylon coated onto the saran surface

The films of Examples 1–8 were each high quality flexible packaging films with a transparent nylon coating that was firmly bonded to the substrate web. The nylon 6 coating layers had a volume crystallinity of about 23%.

Any of the commercial extrudable nylon film-grade resins can be applied with the process of this invention including diamine-dibasic acid type nylons such as nylon 6/6, nylon 6/10, nylon 6/66 and nylon 66/610, and nylons made by the condensation of amino acids or their derivatives such as nylon 6, nylon 11 and nylon 12. The nylon coating can be from ½ to 5 mils thick for most packaging applications, or thicker if so desired. One or more layers of nylon can be applied to a substrate with this process.

The nylon extrusion coating process as described above provides a system for manufacture of nylon extrusion coated packaging films which has a number of important advantages, some of which were discussed hereinabove. The process can be performed on conventional extrusion equipment such as used for polyethylene or hot melt extrusion, thereby enabling versatile use of the extruding equipment and eliminating the need for specialized nylon extrusion coating line. The use of multiple chill rolls, as is common with other extrusion coating processes which apply the extruded material in a melted condition to a substrate, is obviated. Also, the entire process is an in-line operation carried out principally on the chill roll itself and apparatus closely associated with the chill roll. The film which is produced by the process of this invention has, as mentioned earlier, greater clarity and gloss than does the more crystalline variety. The nylon extrusion coated films of this process are especially useful for making formed packages in which a sheet of material is heated and drawn into a pocket by means of vacuum to form a tray-container; this is often used in meat packaging. The nylon coated polyethylene films of this process, for example, have excellent flex-cracking characteristics, are resistant to abrasion and therefore produce few leaking packages, and can be drawn into relatively deep trays. Less heat is required for such forming packaging operations than will be the case with a nylon coating having a higher degree of crystallinity. The amorphous nylon according to this process has a lower density relative to more crystalline coatings, thereby increasing the thickness of coating obtained for a given weight of nylon applied to a substrate. Lastly, it should be recalled that the nylon is cooled to under 200°F while on the chill roll, so that it is substantially below its melting point when withdrawn from the chill roll and joined to the substrate; this is distinguished from prior art nylon extrusion coating processes discussed above in which the nylon is melted when it contacts the substrate.

While this invention has been described with reference to certain specific embodiments in order to illustrate its practice, it is expected that those skilled in the art will be able to devise other changes that will be within the spirit and scope of this invention as set forth in the appended claims.

1. An extrusion coating process for the production of flexible packaging films of nylon coated substrates consisting of the steps of:
   1. heating nylon in an extruder to a melt temperature of 450° to 550°F, and discharging the nylon as a molten web through an extruder die onto the periphery of a rotating chill roll;
   2. arranging the extrusion die at an angle to the chill roll such that the molten nylon web is perpendicular to the lips of the extrusion die when it leaves the die and, further, such that the molten nylon web tangentially contacts the surface of the chill roll;
   3. subjecting the zone between the molten nylon web and the underlying surface of the chill roll to sub-atmospheric pressure;
   4. rapidly cooling the extruded nylon on the surface of the chill roll to under 200°F to form a nylon web with a volume crystallinity of 35% or less; then
   5. withdrawing the cooled nylon web from the chill roll, and thereafter joining the nylon to a substrate web to thereby form the completed packaging film.

2. The process of claim 1, wherein:
the nylon is cooled to a temperature below 150°F on the chill roll.

3. The process of claim 1, wherein:
the zone between the molten nylon web and the underlying surface of the chill roll is subjected to sub-atmospheric pressure of 1 to 2 below the ambient atmospheric pressure.

4. The process of claim 1, including the step of:
cooling the surface of the chill roll to about 90°F to 120°F.

5. The process of claim 1, including the step of:
subjecting a surface of the nylon web to corona discharge treatment after it is withdrawn from the chill roll and before it is joined to the substrate, and then joining the treated surface of the nylon web to the substrate.

6. The process of claim 1, wherein:
the nylon is cooled on the chill roll to a volume crystallinity of about 23%.

* * * * *

PO-1050
(5/69)

UNITED STATES PATENT OFFICE
CERTIFICATE OF CORRECTION

Patent No. 3,930,923      Dated January 6, 1976

Inventor(s) Bentley W. Elliott

It is certified that error appears in the above-identified patent and that said Letters Patent are hereby corrected as shown below:

Column 8, line 28, "1 to 2 below" should be

--1 to 2" below--.

Signed and Sealed this thirteenth Day of April 1976

[SEAL]

Attest:

RUTH C. MASON
*Attesting Officer*

C. MARSHALL DANN
*Commissioner of Patents and Trademarks*